(12) United States Patent
Wing et al.

(10) Patent No.: US 11,997,135 B2
(45) Date of Patent: May 28, 2024

(54) SYSTEMS AND METHODS FOR PROTECTION AGAINST THEFT OF USER CREDENTIALS

(71) Applicant: Citrix Systems, Inc., Ft. Lauderdale, FL (US)

(72) Inventors: Daniel G. Wing, Truckee, CA (US); Manbinder Pal Singh, Coral Springs, FL (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 195 days.

(21) Appl. No.: 17/136,518

(22) Filed: Dec. 29, 2020

(65) Prior Publication Data
US 2022/0210187 A1 Jun. 30, 2022

(51) Int. Cl.
*H04L 29/00* (2006.01)
*H04L 9/40* (2022.01)

(52) U.S. Cl.
CPC .............. *H04L 63/1483* (2013.01)

(58) Field of Classification Search
CPC .................................. H04L 63/1483
USPC ........................................... 726/23
See application file for complete search history.

(56) References Cited

U.S. PATENT DOCUMENTS

| 8,220,047 B1 | 7/2012 | Soghoian et al. |
| 9,736,147 B1 | 8/2017 | Mead |
| 2007/0006305 A1 | 1/2007 | Florencio et al. |
| 2007/0199054 A1* | 8/2007 | Florencio ............ H04L 63/1483 726/5 |
| 2008/0098464 A1 | 4/2008 | Mizrah |
| 2011/0055593 A1 | 3/2011 | Lurey |
| 2014/0181529 A1* | 6/2014 | Joyce, III .............. H04L 9/3226 726/5 |
| 2016/0253492 A1 | 9/2016 | Chougle |
| 2019/0173921 A1 | 6/2019 | Dicorpo et al. |

(Continued)

FOREIGN PATENT DOCUMENTS

| EP | 2348442 | 7/2011 |
| WO | 2021056230 A1 | 4/2021 |

OTHER PUBLICATIONS

International Search Report and Written Submission dated Mar. 25, 2022 for International Application No. PCT/US2021/064914 (9 pages).

(Continued)

*Primary Examiner* — Brandon Hoffman
*Assistant Examiner* — Michael D Anderson

(57) ABSTRACT

A computer system is provided. The computer system includes a memory and at least one processor coupled to the memory and configured to protect against theft of user credentials. The at least one processor is further configured to recognize a uniform resource locator (URL) to which a web browser is navigating, as a URL for which protection is to be provided. The recognition is based on an absence of the URL from a history of visited URLs for which a password has been entered. The at least one processor is further configured to extract a character sequence of selected length that is entered into a field of a website associated with the recognized URL; compare an encryption of the character sequence to entries in a list of encrypted partial passwords of the same selected length; and perform a security action in response to a match resulting from the comparison.

19 Claims, 6 Drawing Sheets

(56) References Cited

U.S. PATENT DOCUMENTS

2019/0349399 A1* 11/2019 Liu .................... H04L 63/1483
2021/0092155 A1    3/2021 Wang et al.

OTHER PUBLICATIONS

International Search Report dated Jun. 23, 2020 for International Patent Application No. PCT/CN2019/107676, 4 pages.
Written Opinion dated Jun. 23, 2020 for International Patent Application No. PCT/CN2019/107676, 4 pages.
"How to check the security state of an XMLHTTPRequest over SSL", downloaded from https://developer.mozilla.org/en-US/docs/Web/API/XMLHttpRequest/How_to_check_the_secruity_state_of_an_XMLHTTPRequest_over_SSL, downloaded Nov. 15, 2019, 9 pages.
U.S. Appl. No. 16/686,888, filed Nov. 18, 2019, 32 pages.

* cited by examiner

SYSTEMS AND METHODS FOR PROTECTION AGAINST THEFT OF USER CREDENTIALS

BACKGROUND

Cyber security is an issue of great importance, as attacks on computer systems and the users of those systems continue to increase. One of the most prevalent, and often most successful, forms of attack is known as the "phishing attack," in which the user is tricked into willingly providing credentials, such as login passwords, to a bad actor or hacker. This can occur under various scenarios. For example, the user may be directed to the hacker's website which is disguised as a legitimate website, and which asks the user to login using his credentials. Many other examples are possible.

SUMMARY

In at least one example, a computer system is provided. The computer system includes a memory; and at least one processor coupled to the memory and configured to: recognize a uniform resource locator (URL) to which a web browser is navigating as a URL for which protection is to be provided, the recognition based on an absence of the URL from a history of visited URLs for which a password has been entered; extract a sequence of characters entered into a website associated with the URL, the extraction performed in response to the recognition; compare an encryption of the extracted sequence of characters to one or more entries in a list of encrypted partial passwords, wherein a character length of the encryption of the extracted sequence of characters is chosen to match a character length of the encrypted partial passwords; and perform a security action in response to a match resulting from the comparison.

At least some examples of the computer system can include one or more of the following features. The list of encrypted partial passwords is generated by detection of passwords provided to visited websites over a selected period of time and encrypting the detected passwords. The list of encrypted partial passwords is generated by obtaining a list of passwords from a web browser database of saved passwords and encrypting the passwords in the obtained list of passwords. The recognition is further based on a match of the URL to an entry in a list of suspect URLs, the list of suspect URLs generated by a URL reputation manager. The at least one processor is further configured to monitor a rate at which the sequence of characters is entered and, in response to the monitored rate exceeding a threshold keystroke rate, disable the security alert and provide a warning that a malicious agent may be hosted on the computer system. The at least one processor is further configured to detect an operation to paste a character string and use the character string as the extracted sequence of characters. The at least one processor is further configured to suppress the security alert if the input field is associated with a label that indicates a password entry is requested. The at least one processor is further configured to provide the security alert if the input field is associated with a label that does not indicate a password entry is requested.

In at least one example, a method for protection of user credentials is provided. The method includes: recognizing, by a computer system, a uniform resource locator (URL) to which a web browser is navigating, as a URL for which protection is to be provided, the recognition based on an absence of the URL from a history of visited URLs for which a password has been entered; extracting, by the computer system, a sequence of characters entered into a website associated with the URL, the extraction performed in response to the recognition; comparing, by the computer system, an encryption of the extracted sequence of characters to one or more entries in a list of encrypted partial passwords, wherein a character length of the encryption of the extracted sequence of characters is chosen to match a character length of the encrypted partial passwords; and performing, by the computer system, a security action in response to a match resulting from the comparison.

At least some examples of the method can include one or more of the following features. The list of encrypted partial passwords is generated by detection of passwords provided to visited websites over a selected period of time and encrypting the detected passwords. The list of encrypted partial passwords is generated by obtaining a list of passwords from a web browser database of saved passwords and encrypting the passwords in the obtained list of passwords. The recognition is further based on a match of the URL to an entry in a list of suspect URLs, the list of suspect URLs generated by a URL reputation manager. The act of monitoring a rate at which the sequence of characters is entered and, in response to the monitored rate exceeding a threshold keystroke rate, disable the security alert and provide a warning that a malicious agent may be hosted on the computer system. The act of detecting a character string paste operation and using the character string as the extracted sequence of characters. The act of suppressing the security alert if the input field is associated with a label that indicates a password entry is requested. The act of providing the security alert if the input field is associated with a label that does not indicate a password entry is requested.

In at least one example, a non-transitory computer readable medium storing executable sequences of instructions to provide protection of user credentials is provided. The sequences of instructions include instructions to: recognize a uniform resource locator (URL) to which a web browser is navigating as a URL for which protection is to be provided, the recognition based on an absence of the URL from a history of visited URLs for which a password has been entered; extract a sequence of characters entered into a website associated with the URL, the extraction performed in response to the recognition; compare an encryption of the extracted sequence of characters to one or more entries in a list of encrypted partial passwords, wherein a character length of the encryption of the extracted sequence of characters is chosen to match a character length of the encrypted partial passwords; and perform a security action in response to a match resulting from the comparison.

At least some examples of the non-transitory computer readable medium can include one or more of the following features. The list of encrypted partial passwords is generated by detection of passwords provided to visited websites over a selected period of time and encrypting the detected passwords. The list of encrypted partial passwords is generated by obtaining a list of passwords from a web browser database of saved passwords and encrypting the passwords in the obtained list of passwords. The recognition is further based on a match of the URL to an entry in a list of suspect URLs, the list of suspect URLs generated by a URL reputation manager. Instructions to monitor a rate at which the sequence of characters is entered and, in response to the monitored rate exceeding a threshold keystroke rate, disable the security alert and provide a warning that a malicious agent may be hosted on the computer system. Instructions to detect an operation to paste a character string and use the character string as the extracted sequence of characters. Instructions to suppress the security alert if the input field is associated with a label that indicates a password entry is requested. Instructions to provide the security alert if the input field is associated with a label that does not indicate a password entry is requested.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
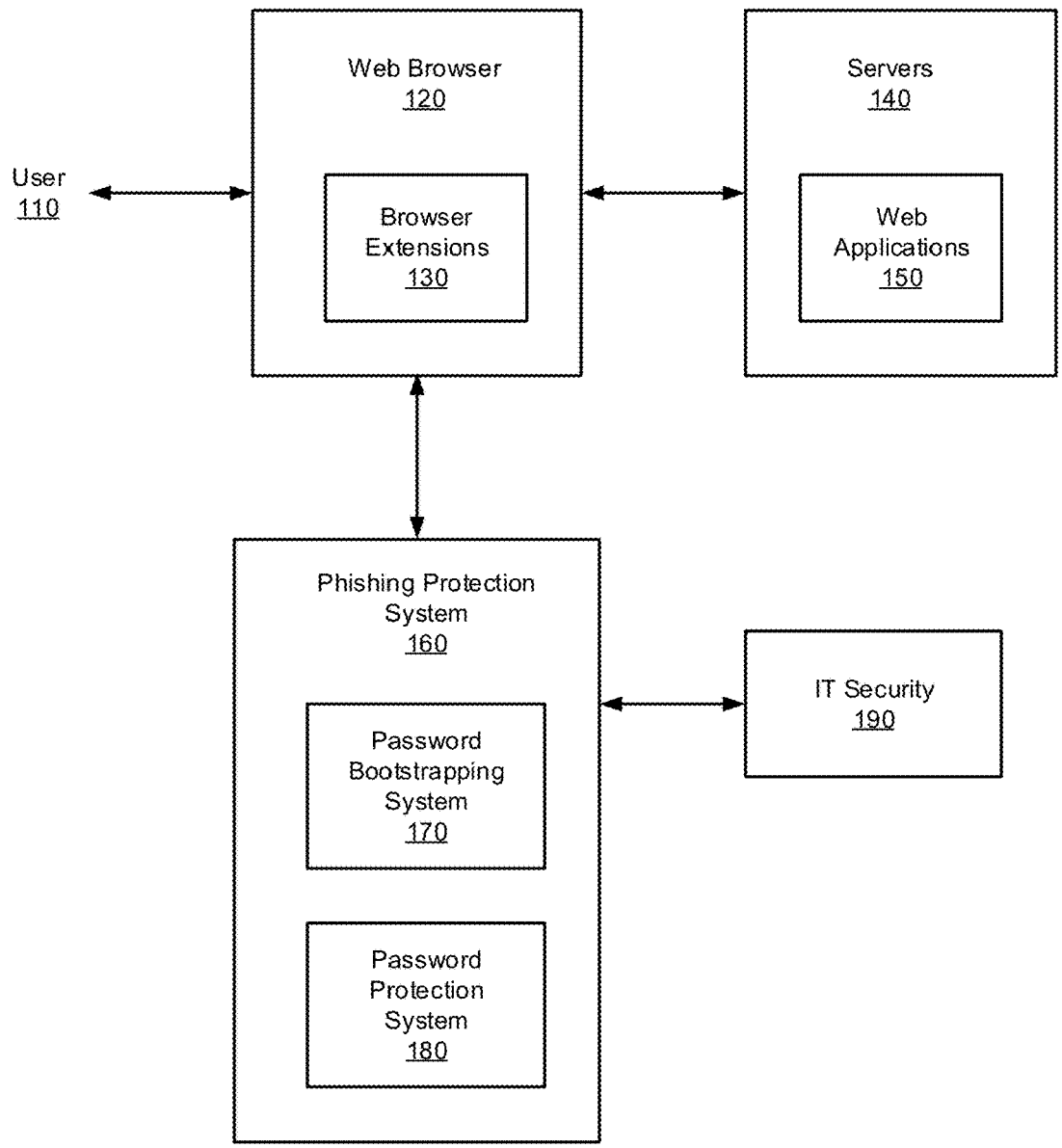
FIG. 1 is a top-level block diagram of an implementation of a system for providing protection against theft of user credentials by phishing websites, in accordance with an example of the present disclosure.

As noted previously, cyber security is a growing concern as attacks on computer systems and the users of those systems increase. Phishing attacks, in particular, pose a serious problem. In a phishing attack, the user may visit a website that is believed to be legitimate and is fooled into entering his credentials (e.g., a password) on an input form of the website. It can often be difficult or impossible for the user to recognize a nefarious website, and so urging users to be diligent is generally not an effective solution to this problem. Likewise, maintaining a blacklist of websites that are known to be dangerous is not effective, as such a list would require constant updates and can never be complete.

To address these and other problems, and as summarized above, various examples described herein are directed to systems and methods for protection against theft of user credentials by phishing websites. In some examples, the disclosed techniques are implemented, at least in part, by a web browser plug-in or extension.

In some examples, the disclosed techniques provide password protection by preventing a user from entering a password into a website by extracting a sequence of characters that are entered by the user into the website, and verifying that the extracted sequence of characters is not a password (or part of a password). This is accomplished by attempting to match the extracted characters to entries in a list of user passwords that were collected during an earlier bootstrapping phase, as described below. If a match occurs, the user can be alerted, or other appropriate action can be taken to prevent a malicious website from obtaining the password. An alert may ask the user to confirm whether or not they wish to proceed. Other actions can include notifying information technology (IT) administration, logging the event for later analysis, and/or forcing a password change.

In some examples, the extracted characters may be limited to a selected number of characters that is less than the full password length, for example the first N characters entered by the user. The choice of N may be based on a trade-off between false alarms (which would increase with a smaller value of N) and reduced efficiency (associated with a larger value of N). The passwords, in the list of passwords, may be referred to as partial passwords in that they are also limited to the selected number (N) of characters. In some examples, the stored partial passwords may be encrypted for security and thus the extracted characters are also encrypted so that they can be matched to the entries in the list.

In some examples, the disclosed techniques employ a bootstrapping phase to collect user passwords for subsequent use during the password protection phase. The bootstrapping phase employs a login monitor to detect user logins to selected websites. A list of selected websites may be provided by IT administration, or other suitable sources, and may include work-related websites, trusted websites, or websites that are otherwise of interest. Passwords entered by the user to these websites are extracted, truncated to the desired length, encrypted, and stored. In some examples, the bootstrapping phase may also harvest passwords from a web browser database which many browsers maintain as part of a password management convenience feature (e.g., autofill) to store user passwords for future use.

Although the bootstrapping phase is employed to collect passwords prior to initiation of the password protection phase, in some examples, the bootstrapping phase can continue to run concurrently with the password protection phase to accumulate additional passwords over time.

These systems and methods overcome a number of security problems. For example, a user may navigate to a website that is unknown to the user, and the website may ask the user to enter their password. This request may provide a plausible reason for this request and appear to be legitimate. The disclosed techniques will warn or prevent the user from entering a password.

As yet another example, a user may attempt to navigate to a legitimate website but get redirected to a phishing website that closely resembles the legitimate website. Here again, the phishing website may ask the user to enter their password in a compellingly plausible matter, and the disclosed techniques will prevent or discourage the user from doing so.

Thus, and in accordance with at least some examples disclosed herein, systems and methods for securing user passwords from detection by a phishing attack are provided. These systems and methods provide for detection and blocking of attempts by a user to enter their password to a phishing website.

As will be understood in view of this disclosure, the systems and methods for providing protection against theft of user credentials by phishing websites provided herein have several advantages over existing methods which rely on user vigilance, which is subject to lapse, or blacklisted websites, which require constant updates and can never be complete. For instance, the systems and methods described herein provide automated protection and do not rely on user action.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements, and features discussed in connection with any one or more examples are not intended to be excluded from a similar role in any other examples.

Password Protection System

FIG. 1 is a top-level block diagram of an implementation of a system 100 for providing protection against theft of user credentials by phishing websites, in accordance with an example of the present disclosure. As shown in FIG. 1, the system comprises a web browser 120, including browser extensions 130, and a phishing protection system 160, including a password bootstrapping system 170 and a password protection system 180.

The web browser 120 is configured to enable the user 110 to navigate to servers 140 and the websites and web applications 150 hosted on those servers. The operation of phishing protection system 160 will be explained in greater detail below, but at a high-level, the password bootstrapping system 170 is configured to monitor user activity to collect user passwords that are provided to legitimate websites so that these passwords will be known and available for subsequent (or concurrent) use by the password protection system 180. The password protection system 180 is configured to detect that the user is entering a password (that was identified and recorded in the bootstrap phase) to a different website, and in response to the detection, take appropriate security measures. These measures may include alerting the user, obtaining confirmation of trust from the user, and alerting IT security/administration 190.

Figure 2:
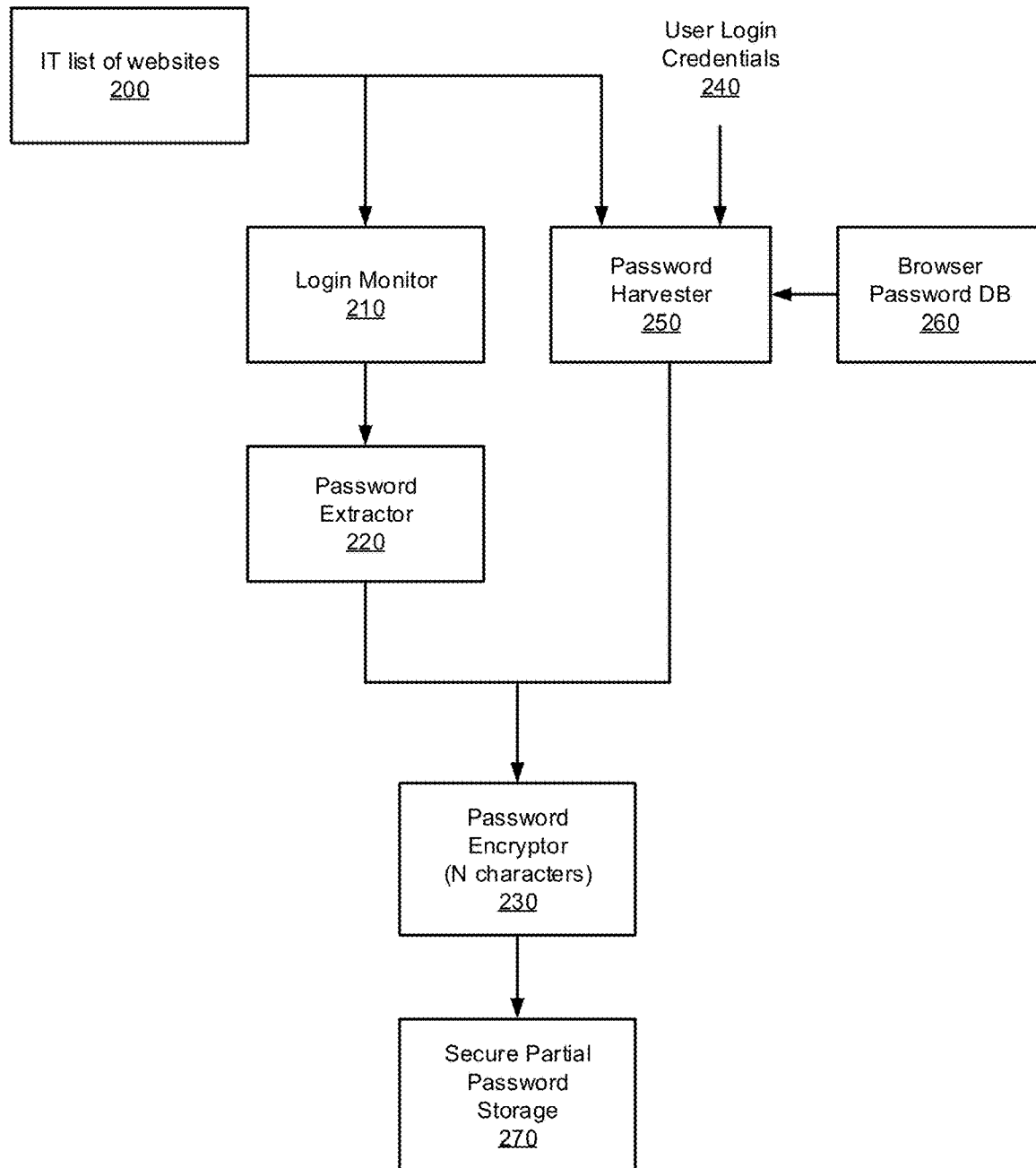
FIG. 2 is a block diagram of a password bootstrapping system, in accordance with an example of the present disclosure.

FIG. 2 is a block diagram of the password bootstrapping system 170, in accordance with an example of the present disclosure. The password bootstrapping system 170 is shown to include a login monitor 210, a password extractor 220, a password harvester 250, a password encryptor 230, and secure partial password storage 270.

The login monitor 210 is configured to monitor user logins to websites that are included on an IT-provided list 200 of work-related websites or websites that are otherwise of interest, so that the user password can be captured for these sites, as explained below. In some examples, the list 200 may include websites that are known or believed to be trusted, for example, based on data provided by a website reputation checker 350 of FIG. 3. The use of a list of specific websites provided by IT reduces the need to store passwords for websites that are not of interest. For example, if the user is an employee of a business enterprise, that enterprise may not be interested in websites related to the employee's personal banking or other personal matters. The use of list 200 also enables the password protection system 180 to treat these websites as "always-allow" sites for which protection is not required. This can improve efficiency and reduce the false alarm rate.

The password extractor 220 is configured to detect that the user is entering characters (e.g., typing keystrokes) into an input field or form of the website, or any other feature of the website (e.g., an image file presented to the user), and to extract those characters into a string of a selected length (e.g., a partial password of length N characters). In some examples, the length N may be on the order of 5 characters. In some examples, the N characters may be the first N characters of the password. In some examples, the N characters may be the last N characters of the password or some other portion of the password, so long as the system prevents transmission of the completed string. In some examples the N characters may be all of the characters of the password. In these examples, the bootstrap phase is also configured to use the same subset of N characters.

In some examples, the password extractor 220 can detect that the characters being entered are password related based on a determination that the input field or form is tagged with a hypertext markup language (HTML) label of "type=password," as would typically be the case with a legitimate website.

The password encryptor 230 is configured to encrypt or hash the extracted character string of length N to be saved in secure partial password storage 270, for use by the password protection system 180 of FIG. 1.

To provide an alternative or additional bootstrapping technique, the password harvester 250 is configured to harvest passwords that have been previously collected and stored by the web browser 120 of FIG. 1, in a browser password database 260. For example, many web browsers have a password management feature that can store user entered passwords for future use, with the permission of the user, so that the user does not have to supply the password every time they navigate to a given website. The passwords stored in the browser password database 260 are typically encrypted, and thus knowledge of the user login credentials 240 may be required to obtain these passwords. Once obtained, they can be truncated to the selected length of N characters, re-encrypted by password encryptor 230, and stored in the secure partial password storage 270, for use by the password protection system 180. In some examples, in which the web browser 120 is under secure control, the password encryptor 230 may be incorporated in the web browser 120 and the partial passwords may also be stored in the browser password database 260.

Figure 3:
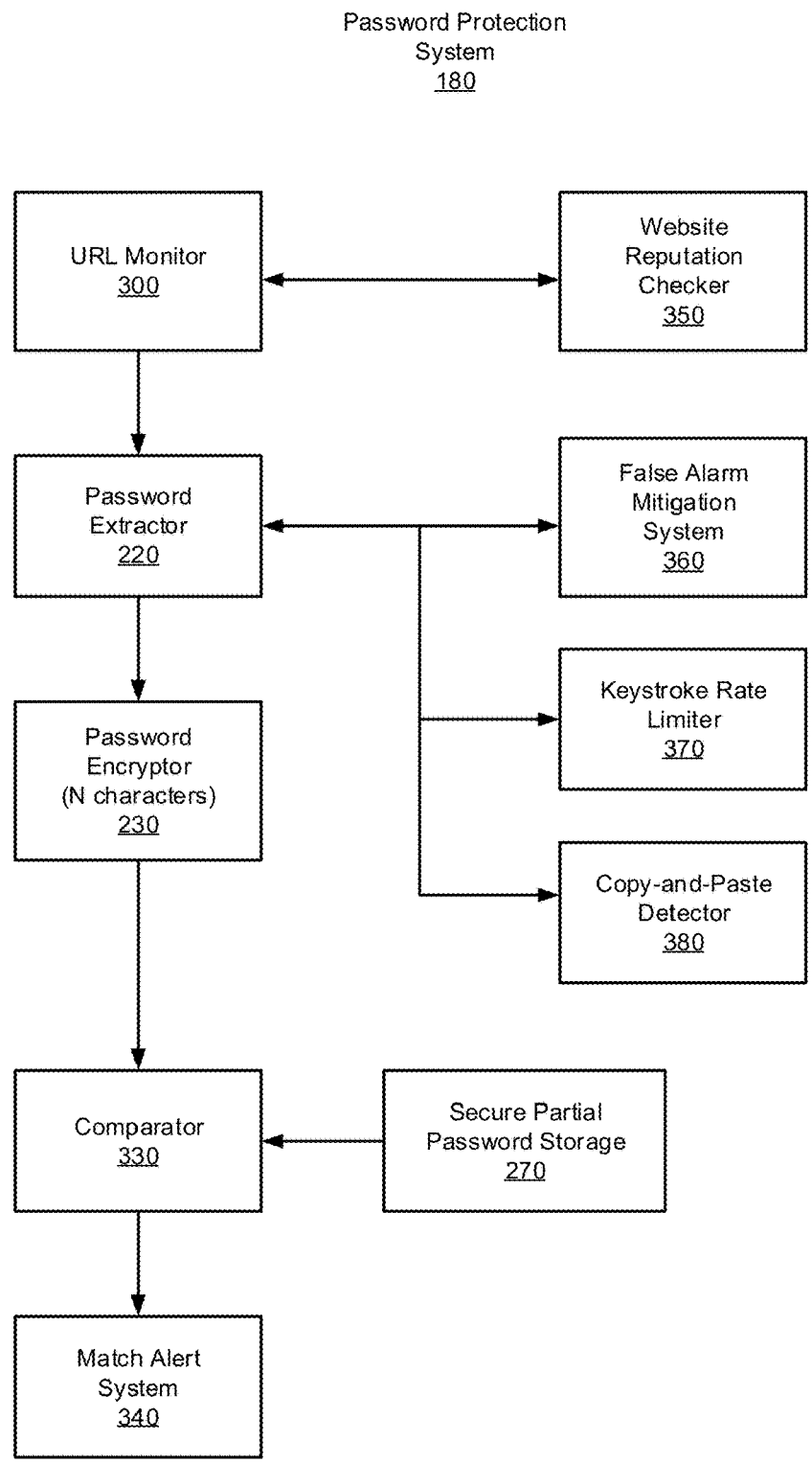
FIG. 3 is a block diagram of a password protection system, in accordance with an example of the present disclosure.

FIG. 3 is a block diagram of the password protection system 180, in accordance with an example of the present disclosure. The password protection system 180 is shown to include a uniform resource locator (URL) monitor 300, the password extractor 220 of FIG. 2, the password encryptor 230 of FIG. 2, a comparator 330, a match alert system 340, a website reputation checker 350, a false alarm mitigation system 360, a keystroke rate limiter 370, and a copy-and-paste detector 380.

The URL monitor 300 is configured to monitor user navigations to websites and compare the domain names of those websites to entries in the IT-provided list 200 of FIG. 2. If there is a match, and that website has already been through the bootstrap process, then no further action with respect to password protection is required, and the user is allowed to proceed and interact with that website. If, however, there is a match, and that website has not been previously bootstrapped, then the bootstrap process may now be performed on that website.

Additionally, in some examples, if there is not a match, a website reputation checker 350 may be consulted to determine if the website is trustworthy, and if so, the user is allowed to proceed and interact with that website without requiring further password protection. In some examples, this behavior may be configured by the IT administrator. In the case where the user is using an updated password for the website, the password bootstrapping system 170 of FIG. 1 may still continue to function, where password encryptor 230 re-encrypts the password provided by the user and stores it in the secure partial password storage 270 of FIG. 2.

The website reputation checker 350 may also be employed to generate a blacklist of suspected phishing sites which can be used to trigger a security alert or other corrective action. The website reputation checker 350 may employ any suitable techniques to monitor the reputation of websites, in light of the present disclosure. In some examples, the website reputation checker 350 may employ the Webroot Brightcloud™ application programming interface (API).

Otherwise, if there is not a match, the password extractor 220 is employed to detect that the user is entering a password into an input field or form of the website, and to extract those characters into a string of a length N characters as previously described in connection with the bootstrapping system.

The password encryptor 230, is configured to encrypt or hash the extracted character string of length N for comparison, by comparator 330, with the entries in the secure partial password storage 270 of FIG. 2.

The match alert system 340 is configured to generate an alert of any suitable type, or other corrective action, in response to the comparator finding a match between the encrypted partial password entered by the user and an entry in the secure partial password storage 270. In some examples, an alert may comprise a pop-up window informing the user that they are entering one of their passwords into the website and asking for confirmation to proceed. In some examples, the alert may include a warning sent to the IT administrator 190 of FIG. 1.

The false alarm mitigation system 360 is configured to reduce the false alarm rate of password phishing alerts. In some examples, the false alarm mitigation system 360 limits alerts to incidents in which the website is being visited for the first time and/or a password is being supplied to the website for the first time. In some examples, the web browser history of visited URLs may be used to obtain this information. This eliminates multiple alerts for the same potential phishing threat. In some examples, the false alarm mitigation system 360 limits alerts to incidents in which the password is being entered into an input field or form that is not labeled as "type=password." This can be effective since legitimate websites that ask for passwords typically use the "type=password" label as an aid to the browser password manager. Suspicion of credential theft is raised if a website asks the user to enter a password into a field that is not labeled in this manner. In some examples, the false alarm mitigation system 360 limits alerts to incidents in which the password is being entered into a first or second field of the web page since a password (or a username and password) are typically the initial requests of a webpage (e.g., first and/or second fields requiring input). In some further examples, the false alarm rate can be reduced by skipping the password protection phase for websites that have been whitelisted as trustworthy, for example, by the IT administrator 190.

The keystroke rate limiter 370 is configured to detect entry of characters at a rate that exceeds human typing capabilities (e.g., thousands of characters per second or more). Some attacking techniques employ bots or other malicious agents (for example on the user's computer system) to simulate entry of large numbers of passwords, for example millions of words from a dictionary, in an attempt to get a partial password match that triggers an alert. If successful in this attempt, the alert provides the attacker with a verification that they have obtained at least a partial password. In order for this method of attack to be practical, however, the characters have to be entered at extremely high keystroke rates that far exceed what a human could achieve. Thus, if the keystroke rate limiter 370 detects character entry at an excessive rate, the match alert can be disabled, and a second type of alert can be provided to warn the user or IT administrator that a malicious agent may be executing on their browser or computer system. This second alert will not give away the fact that a password entry was detected because the excessive keystroke rate will typically be detected (and the second alert provided) before an actual password is entered.

The copy-and-paste detector 380 is configured to detect that the user is performing a copy-and-paste operation to insert a password into an input field or form of the web page. Given that users are encouraged to use longer and more complex passwords that are difficult to remember and cumbersome to type out, many users resort to saving their passwords in a document, spreadsheet, or password manager, and then copy-and-pasting them into input fields as needed. The copy-and-paste detector 380 detects the keystrokes (e.g., control-c, control-v) or other operations (e.g., copy/paste events) that are associated with the copy-and-paste operation, and then intercepts the string that would be pasted before it is provided to the web page. In some examples, this may be accomplished by listening for the web browsers, JavaScript, paste event, or drag/drop events. That string can then be used by the password extractor 220 and the other components of the password protection system 180, as described previously. If the process does not result in a match alert, the string can then be provided to the web page.

Password Protection Process

As described above, some examples of the system 100 of FIG. 1 are configured to perform a process for providing protection against theft of user credentials by phishing websites. The processes may be executed on a processor of any suitable type (e.g., processor 610 of FIG. 6). The processes may further be implemented through execution of a web browser plug-in or extension.

Figure 4:
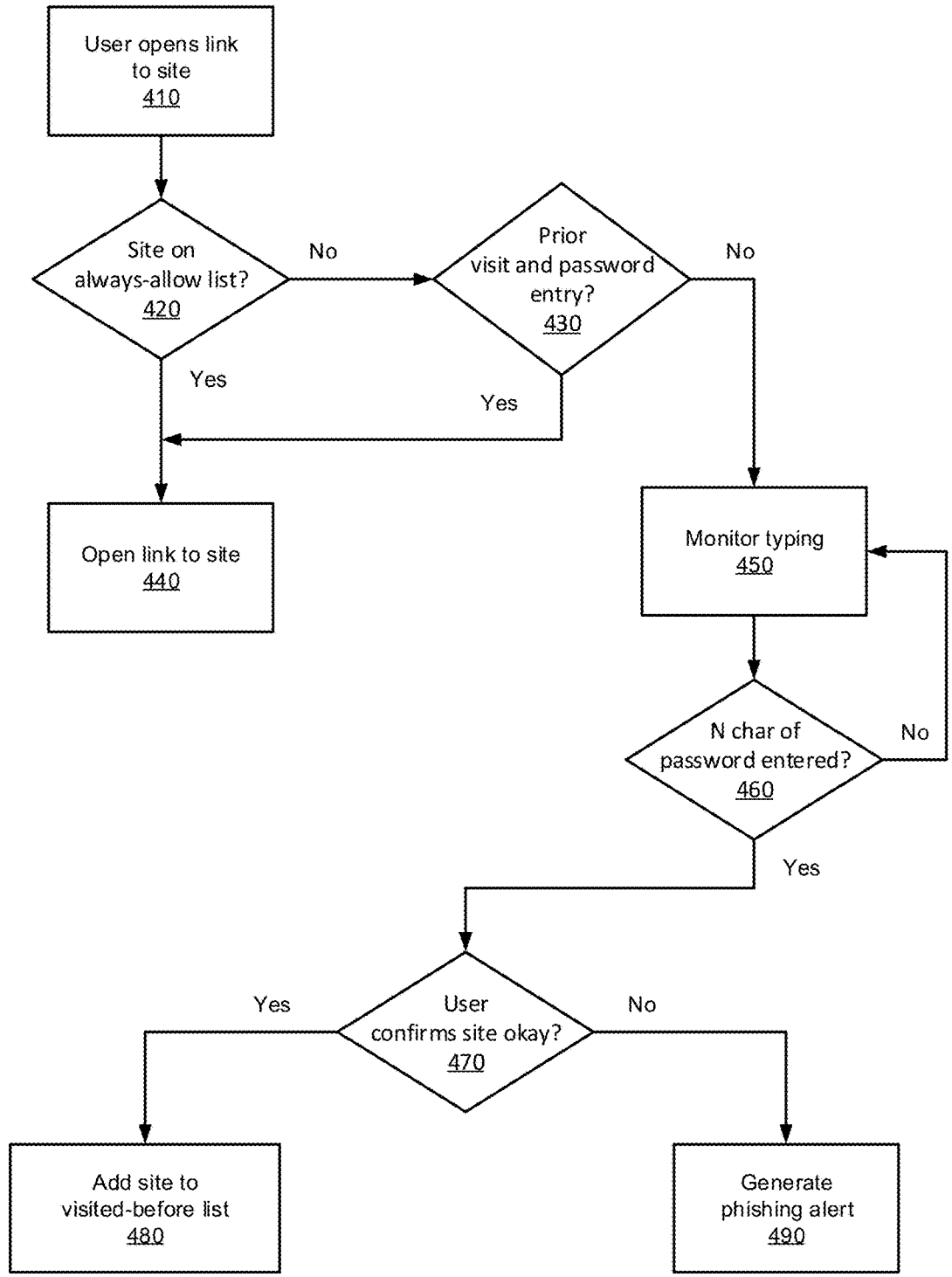
FIG. 4 is a flow diagram of a process for providing protection against theft of user credentials by phishing websites, in accordance with an example of the present disclosure.

FIG. 4 is a flow diagram of a process 400 for providing protection against theft of user credentials by phishing websites, executed by any combination of the system elements/components 170 and 180, of FIG. 1, or the sub-components thereof, in accordance with an example of the present disclosure.

The process 400 starts at operation 410, when the user opens a link to a website. Next, at operation 420, the system checks whether the site is on the "always-allowed" list, for example the IT provided list of websites 200 of FIG. 2. If so, at operation 440, the link to the website is opened. Otherwise, at operation 430, the system checks to determine if the website has been previously visited and if a password has been entered on that website (e.g., by checking a visited-before list). If so, then again, at operation 440, the link to the website is opened, since protection against that website is not needed at this point. Otherwise, at operation 450, user input is monitored, and character keystrokes are extracted and accumulated into a character string. At operation 460, when a selected number (N) of characters have been accumulated, they are encrypted and compared to the encrypted password strings of length N that have been stored in the bootstrapping process. If a match is not found, then the procedure loops back to continue monitoring at operation 450. Otherwise, if a match is found, the user is asked, at operation 470, to confirm whether or not the website is to be trusted. If the user confirms trust in the website, then at operation 480, that site is added to the visited-before list. Otherwise, at operation 490, a phishing alert is generated, or other suitable action may be taken. In some examples, the alert may show the domain for which the comparator has found the match and also the domain for the current site, as that information may be useful to some users.

Figure 5:
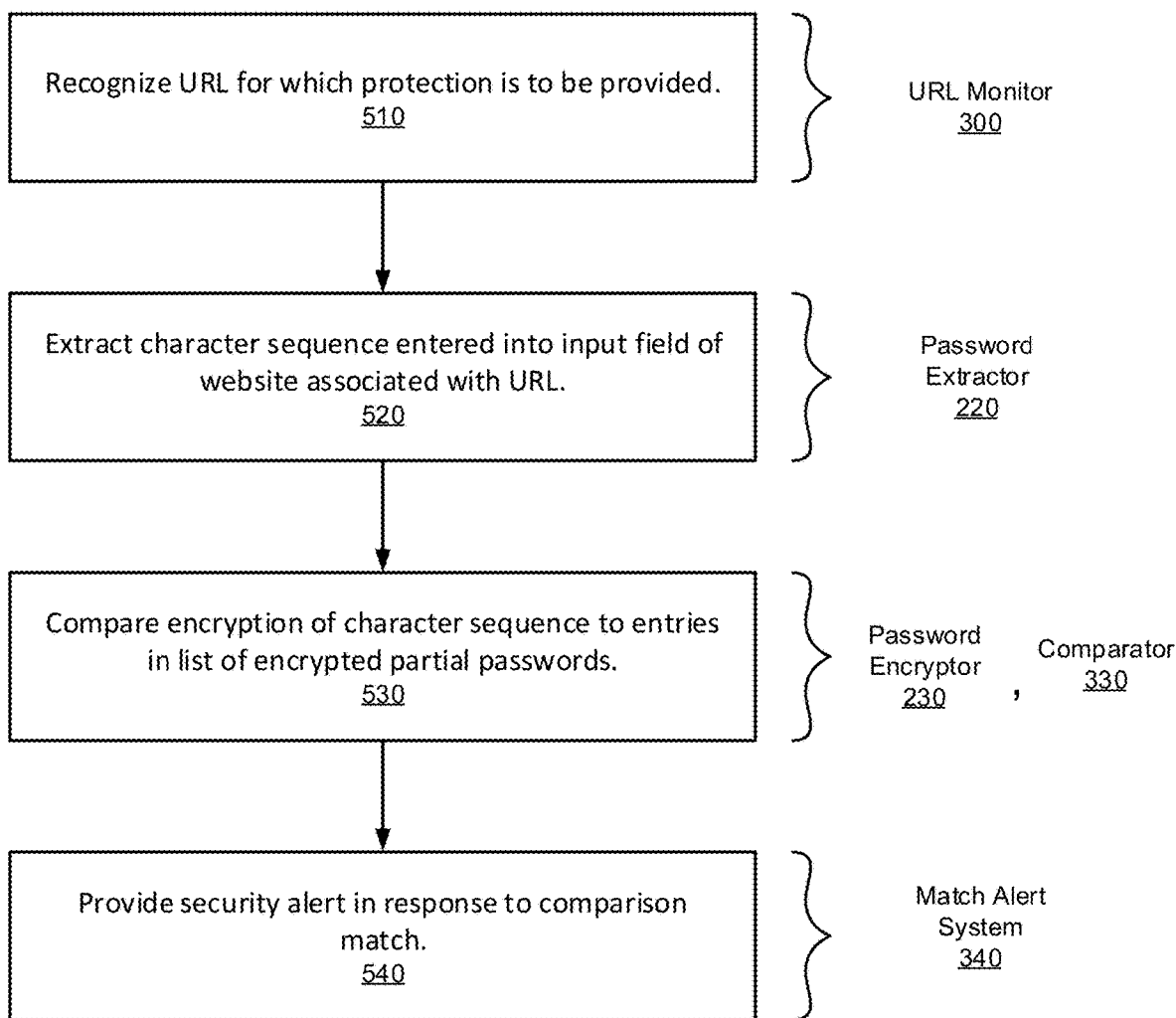
FIG. 5 is another flow diagram of a process for providing protection against theft of user credentials by phishing websites, in accordance with an example of the present disclosure.

FIG. 5 is a flow diagram of another process 500 for providing protection against theft of user credentials by phishing websites, executed by any combination of the system elements/components 170 and 180, of FIG. 1, or the sub-components thereof, in accordance with an example of the present disclosure.

The process 500 starts with recognizing, at operation 510, a URL to which a web browser is navigating, as a URL for which protection is to be provided. The recognition is based on an absence of the URL from a history of visited URLs for which a password has been entered. Said differently, the URL is associated with a website that the user has not previously visited or provided a password.

Next, at operation 520, a sequence of characters is extracted which are entered into the website associated with the URL. The extraction is performed in response to the recognition at operation 510.

At operation 530, the extracted sequence of characters is encrypted and compared to one or more entries in a list of encrypted partial passwords. In some examples, the character length of the encryption of the extracted sequence of characters matches the character length of the encrypted partial passwords. In some examples, the character length may be 5 characters. In some examples, the character length is configurable by the IT administrator.

At operation 540, a security alert is provided, or other suitable action taken, in response to a match resulting from the comparison.

The processes disclosed herein each depict one particular sequence of acts in a particular example. Some acts are optional and, as such, can be omitted in accord with one or more examples. Additionally, the order of acts can be altered, or other acts can be added, without departing from the scope of the apparatus and methods discussed herein.

Computing Platform for Protection Against Theft of User Credentials

Figure 6:
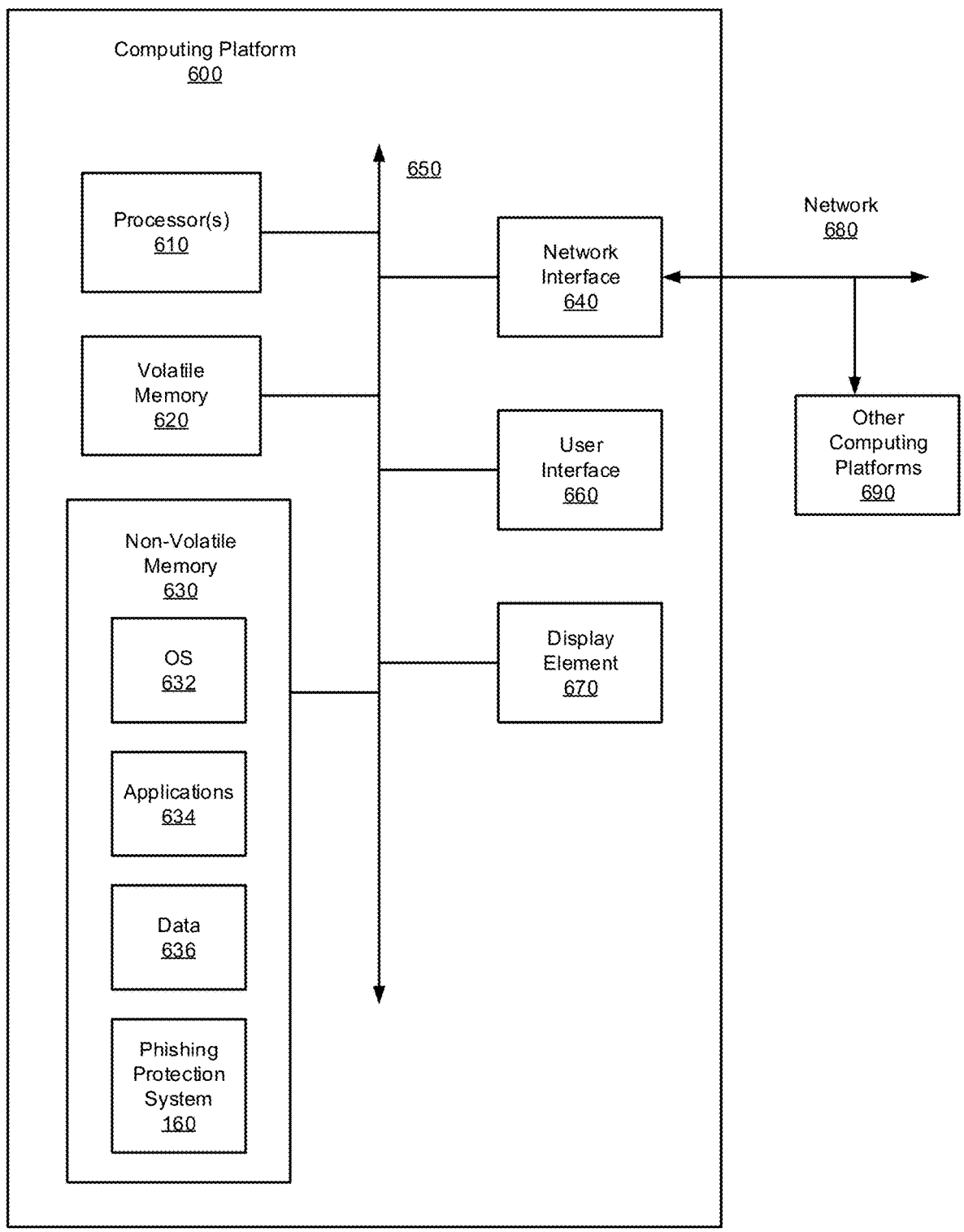
FIG. 6 is a block diagram of a computing platform configured to perform a process for providing protection against theft of user credentials by phishing websites, in accordance with an example of the present disclosure.

FIG. 6 is a block diagram of a computing platform 600 configured to perform a process for providing protection against theft of user credentials by phishing websites, in accordance with an example of the present disclosure. In some cases, the platform 600 may be a workstation, server, laptop, mobile device, or smartphone.

The computing platform or device 600 includes one or more processors 610, volatile memory 620 (e.g., random access memory (RAM)), non-volatile memory 630, one or more network or communication interfaces 640, user interface (UI) 660, display element (e.g., screen) 670, and a communications bus 650. The computing platform 600 may also be referred to as a computer or a computer system.

The non-volatile (non-transitory) memory 630 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 660 can include one or more input/output (I/O) devices (e.g., a mouse, a keyboard, a microphone, one or more speakers, one or more biometric scanners, one or more environmental sensors, and one or more accelerometers, etc.).

The display element 670, can provide a graphical user interface (GUI) and in some cases, may be a touchscreen or any other suitable display device.

The non-volatile memory 630 stores an operating system 632, one or more applications 634 (including web browsers), data 636, and elements of phishing protection system 160 of FIG. 1, such that, for example, computer instructions of the operating system 632, the applications 634, and the elements of phishing protection system 160, are executed by processor(s) 610 out of the volatile memory 620. In some examples, the volatile memory 620 can include one or more types of RAM and/or a cache memory that can offer a faster response time than a main memory. Data can be entered through the user interface 660. Various elements of the computer 600 can communicate via the communications bus 650.

The illustrated computing platform 600 is shown merely as an example client device or server and can be implemented by any computing or processing environment with any type of machine or set of machines that can have suitable hardware and/or software capable of operating as described herein.

The processor(s) 610 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 610 can be analog, digital, or mixed. In some examples, the processor 610 can be one or more physical processors, or one or more virtual (e.g., remotely located or cloud) processors. A processor including multiple processor cores and/or multiple processors can provide functionality for parallel, simultaneous execution of instructions or for parallel, simultaneous execution of one instruction on more than one piece of data.

The network interfaces 640 can include one or more interfaces to enable the computing platform 600 to access a computer network 680 such as a Local Area Network (LAN), a Wide Area Network (WAN), a Personal Area Network (PAN), or the Internet through a variety of wired and/or wireless connections, including cellular connections. In some examples, the network 680 may allow for communication with other computing platforms 690, to enable distributed computing.

In described examples, the computing platform 600 can execute an application on behalf of a user of a client device. For example, the computing platform 600 can execute one or more virtual machines managed by a hypervisor. Each virtual machine can provide an execution session within which applications execute on behalf of a user or a client device, such as a hosted desktop session. The computing platform 600 can also execute a terminal services session to provide a hosted desktop environment. The computing platform 600 can provide access to a remote computing environment including one or more applications, one or more desktop applications, and one or more desktop sessions in which one or more applications can execute.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

The invention claimed is:

1. A computer system comprising:
a memory; and
at least one processor coupled to the memory and configured to:
recognize a uniform resource locator (URL) to which a web browser is navigating as a URL for which protection is to be provided, the recognition based on an absence of the URL from a history of visited URLs for which a password has been entered;
extract a sequence of characters entered into a website associated with the URL, the extraction performed in response to the recognition;
monitor a rate at which the sequence of characters is entered;
compare an encryption of the extracted sequence of characters to one or more entries in a list of encrypted partial passwords, wherein a character length of the encryption of the extracted sequence of characters is chosen to match a character length of the encrypted partial passwords, wherein the character length of the encrypted partial passwords is less than a full password length;
perform a security action in response to a match resulting from the comparison; and
in response to the monitored rate exceeding a threshold keystroke rate, disable the security action and provide a warning that a malicious agent may be hosted on the computer system.

2. The computer system of claim 1, wherein the list of encrypted partial passwords is generated by detection of passwords provided to visited websites over a selected period of time and encrypting the detected passwords.

3. The computer system of claim 1, wherein the list of encrypted partial passwords is generated by obtaining a list of passwords from a web browser database of saved passwords and encrypting the passwords in the obtained list of passwords.

4. The computer system of claim 1, wherein the recognition is further based on a match of the URL to an entry in a list of suspect URLs, the list of suspect URLs generated by a URL reputation manager.

5. The computer system of claim 1, wherein the at least one processor is further configured to suppress the security action if an input field of the website is associated with a label that indicates a password entry is requested.

6. The computer system of claim 1, wherein the at least one processor is further configured to provide the security action if an input field of the website is associated with a label that does not indicate a password entry is requested.

7. A method for protection of user credentials comprising:
recognizing, by a computer system, a uniform resource locator (URL) to which a web browser is navigating, as a URL for which protection is to be provided, the recognition based on an absence of the URL from a history of visited URLs for which a password has been entered;
extracting, by the computer system, a sequence of characters entered into a website associated with the URL, the extraction performed in response to the recognition;
monitoring, by the computer system, a rate at which the sequence of characters is entered;
comparing, by the computer system, an encryption of the extracted sequence of characters to one or more entries in a list of encrypted partial passwords, wherein a character length of the encryption of the extracted sequence of characters is chosen to match a character length of the encrypted partial passwords, wherein the character length of the encrypted partial passwords is less than a full password length;

performing, by the computer system, a security action in response to a match resulting from the comparison; and in response to the monitored rate exceeding a threshold keystroke rate, disable the security action and provide a warning that a malicious agent may be hosted on the computer system.

8. The method of claim 7, wherein the list of encrypted partial passwords is generated by detection of passwords provided to visited websites over a selected period of time and encrypting the detected passwords.

9. The method of claim 7, wherein the list of encrypted partial passwords is generated by obtaining a list of passwords from a web browser database of saved passwords and encrypting the passwords in the obtained list of passwords.

10. The method of claim 7, wherein the recognition is further based on a match of the URL to an entry in a list of suspect URLs, the list of suspect URLs generated by a URL reputation manager.

11. The method of claim 7, further comprising suppressing the security action if an input field of the website is associated with a label that indicates a password entry is requested.

12. The method of claim 7, further comprising providing the security action if an input field of the website is associated with a label that does not indicate a password entry is requested.

13. A non-transitory computer readable medium storing executable sequences of instructions to provide protection of user credentials, the sequences of instructions comprising instructions to:

recognize a uniform resource locator (URL) to which a web browser is navigating as a URL for which protection is to be provided, the recognition based on an absence of the URL from a history of visited URLs for which a password has been entered;

extract a sequence of characters entered into a website associated with the URL, the extraction performed in response to the recognition;

compare an encryption of the extracted sequence of characters to one or more entries in a list of encrypted partial passwords, wherein a character length of the encryption of the extracted sequence of characters is chosen to match a character length of the encrypted partial passwords, wherein the character length of the encrypted partial passwords is less than a full password length;

perform a security action in response to a match resulting from the comparison; and monitor a rate at which the sequence of characters is entered and, in response to the monitored rate exceeding a threshold keystroke rate, disable the security action and provide a warning that a malicious agent may be hosted on the computer system.

14. The computer readable medium of claim 13, wherein the list of encrypted partial passwords is generated by detection of passwords provided to visited websites over a selected period of time and encrypting the detected passwords.

15. The computer readable medium of claim 13, wherein the list of encrypted partial passwords is generated by obtaining a list of passwords from a web browser database of saved passwords and encrypting the passwords in the obtained list of passwords.

16. The computer readable medium of claim 13, wherein the recognition is further based on a match of the URL to an entry in a list of suspect URLs, the list of suspect URLs generated by a URL reputation manager.

17. The computer readable medium of claim 13, wherein the sequences of instructions further include instructions to detect an operation to paste a character string and use the character string as the extracted sequence of characters.

18. The computer readable medium of claim 13, wherein the sequences of instructions further include instructions to suppress the security action if an input field of the website is associated with a label that indicates a password entry is requested.

19. The computer readable medium of claim 13, wherein the sequences of instructions further include instructions to provide the security action if an input field of the website is associated with a label that does not indicate a password entry is requested.

* * * * *